Patented Apr. 20, 1954

2,676,132

UNITED STATES PATENT OFFICE

2,676,132

1,2,3,4,10,10 - HEXACHLORO -6,7- EPOXY- 1,4,4a,5,6,7,8,8a - OCTAHYDRO - 1,4,5,8- DIMETHANONAPHTHALENE AND INSECTICIDAL COMPOSITIONS THEREOF

Henry Bluestone, Denver, Colo., assignor, by mesne assignments, to Shell Development Company, Emeryville, Calif., a corporation of Delaware No Drawing. Application April 18, 1950,
Serial No. 156,716

4 Claims. (Cl. 167—33)

This invention relates to new compositions of matter possessing unexpectedly high toxicity to insect life and particularly to insect life but little affected by the halogenated hydrocarbons and their derivatives hitherto employed.

The copending application of Samuel Barney Soloway, Serial No. 63,626, filed December 4, 1948, relates to a group of polycyclic halogenated hydrocarbons and derivatives thereof which show not only unexpectedly high insecticidal activity but in addition a surprisingly high order of stability to reagents which normally readily degrade the previously known organic halogenated insect toxicants, and they also relate to the methods for producing these new compositions.

This invention relates, more specifically, to new members of the above described group of polycyclic halogenated hydrocarbons and their derivatives which possess in addition to the common properties of those compounds previously disclosed new properties in such marked degree as to render them particularly suitable and valuable in combatting pests but little affected by many or most of the family of compounds to which these members belong.

One object of this invention is to produce organic materials possessing a high order of insecticidal activity.

Another object of this invention is the production of a group of insecticidally active organic compounds which are stable, under ordinary conditions of use, to the usual degradative action of acids and alkalies.

Another object of this invention is the production of a group of stable, insecticidally active compounds with varying degrees of residual insecticidal activity.

Still another object of this invention is the production of organic materials possessing a high order of insecticidal activity with respect to insect species which, in general, are but poorly controlled by previously known halogenated organic insecticides.

A still further object of this invention is to provide means for the production of these new and valuable insect toxicants.

Other objects, features, capabilities and advantages are comprehended by the invention, as will later appear and as are inherently possessed thereby.

While, in recent years, a number of halogenated hydrocarbons or simple hydrocarbon derivatives have been discovered which possess, to a high degree, the property of toxicity to various forms of insect life these materials all possess limitations which to a lesser or greater extent reduce their utility and applicability. Thus, except for the compounds disclosed in the above cited co-pending applications all of the hitherto known organic halide insect toxicants have possessed the tendency to lose halogen and concomitantly their insecticidal activity.

Moreover, all of the previously discovered halogenated hydrocarbon toxicants, while extremely effective against many varieties of insect pests, are of limited or little use in combatting many other equally undesirable insect species. This fact is, in itself, not particularly surprising in view of the enormous number of insect species known and the large differences which can exist between species. It is therefore hardly surprising that no single insecticidal compound can be successfully used against all species.

Somewhat less understandable is the fact that certain large classes of noxious insects have possessed substantial immunity to all of the previously discovered halogenated insect toxicants, including those specifically disclosed in the copending applications hereinabove referred to.

I have now found that some classes of insects heretofore uncontrollable through the use of halogenated hydrocarbon toxicants are highly susceptible to the action of my new composition of matter. Since these classes of insects have, until now, been relatively resistant to compounds of this general type the fact that they are attracted by my new composition is both novel and unanticipated. This fact is even more surprising inasmuch as my new compounds are structurally quite similar to those disclosed in the copending applications hereinabove cited; they are actually stereoisomers of the compounds disclosed therein. Like the previously disclosed isomers my new compounds, while possessing a very high order of insecticidal activity, have their halogen atoms so firmly bound as to make them stable under conditions of alkalinity which cause the older halogenated insecticidal materials to lose halogen, and, simultaneously, to lose activity.

My new compositions of matter are obtained directly by reacting one to four moles of a cyclopentadiene with 1,2,3,4,7,7 - hexahalobicyclo- (2.2.1)-2,5-heptadiene and by further transformation of such primary product. The new compositions thus obtained possess the basic carbon skeleton of a series of not more than five linearly fused bicyclo-(2.2.1)-heptane rings, the fusion occurring through the two-carbon atom bridges of the bicyclic rings to produce a structure containing two terminal five-carbon atom rings, each of which is characterized by an ethylenic bond in its unfused two-carbon atom bridge. The basic carbon atom skeleton, in planar representation is, therefore, the one illustrated immediately hereinafter:

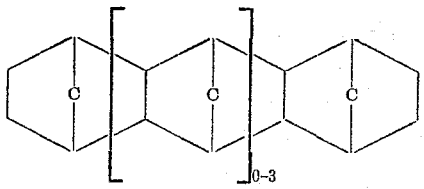

My new compositions are further characterized by the following unique structural features. Of the two terminal five membered carbon rings one contains a double bond in the unfused two-carbon atom bridge and bears on its carbon atoms only halogen atoms which, in general, may be of one species only or may be comprised of atoms of more than one halogen species; the halogens thus present are preferably those with atomic numbers lying between 16 and 36, or a range embracing chlorine and bromine: the remaining terminal five membered carbon atom ring contains one monovalent component attached to each of the two carbon atoms of the unfused two-carbon atom bridge.

The two carbon atoms of the two-carbon atom bridge forming part of the second terminal five-carbon atom ring also carry an epatomic component.

The term "epatomic component" hereinabove employed is restricted generically to the epoxide oxygen atom, the similarly bound sulfur atom, the similarly bound nitrogen atom and to groups containing sulfur and nitrogen atoms bound to the carbon ring system through those atoms in similar fashion. It thus includes the following illustrated atoms and groups when they are attached to each of two adjacent carbon atoms occurring in a carbon atom chain or ring structure:

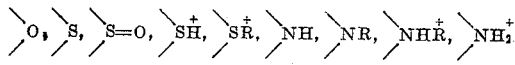

R being here used to represent any of the univalent atoms or radicals which, as is well known to those skilled in the art, can be attached to such sulfur and nitrogen atoms, such, for example, as alkyl groups, aryl groups, and many similar groups including, of course, their unsaturated and substituted derivatives.

For purposes of generic representation in structural formulae the epatomic group will be shown as

attached always to two adjacent carbon atoms, as follows:

The number of fused bicycloheptane rings present in the molecule will be determined by the number of moles of cyclopentadiene reacted with the halogenated polycyclic diene. When the two reactants are reacted in a mole to mole ratio the new molecule will contain only two fused bicycloheptane rings.

The cyclopentadiene chosen for the reaction can be either cyclopentadiene itself or a substituted cyclopentadiene such, for example, as methylcyclopentadiene, dimethylcyclopentadiene, etc. In this way, a variety of alkyl, cycloalkyl, arylalkyl and aryl substituents and derivatives thereof may be introduced into the unhalogenated ring or rings of my new compound. For ease of reference all such groups will hereinafter be called "alkyl" groups and the word "alkyl" will not be employed in its more restricted meaning without specifically noting that fact.

Halogen derivatives in which the halogen is attached to carbon atoms other than those of the unfused two-carbon atom bridge of the originally unhalogenated terminal five-carbon atom ring can be obtained by halogenating the primary compounds resulting from the Diels-Alder reaction. Subsequent to halogenation the application of the usual procedures for producing esters, alcohols and ethers from halo compounds will give rise to other of my new compounds.

Contemplated by and included within the scope of our present invention as hereinabove set forth are the compounds which are obtained by adding a variety of reagents to the ethylenic bond of the unhalogenated terminal five-carbon atom ring. Of particular interest and significance is the reaction of the aforementioned reactive double bond with a peracid to produce an epoxide.

Thus, these compounds of my invention may also be represented by the following planar structural formula:

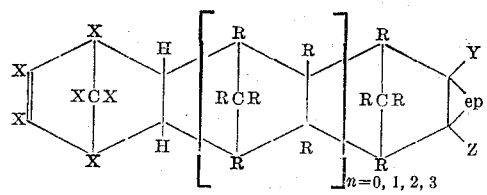

where the X's are halogen atoms, particularly chlorine and/or bromine; the R's are independently selected from hydrogen, halogen, or hydrocarbon radicals; Y and Z are independently selected from monovalent substituents such that the elements therein are at the maximum limited to the four elements hydrogen, halogen, oxygen and carbon; and "ep" is an epatomic group as characterized hereinbefore.

The R type groups in the compounds of my invention may arise through the use of substituted cyclopentadienes in the preparation of dienophiles from which some of the new compositions may be considered to be derived, as the result of halogenation reactions, or as the result of other reactions utilized to introduce such groups into the pentacarbon ring involved. They may also arise through the use of substituted cyclopentadienes in the reaction of such dienes with 1,2,3,4,7,7 - hexachlorobicyclo - (2.2.1) - 2,5-heptadiene.

The reaction product which is obtained when one mole of 1,2,3,4,7,7-hexachlorobicyclo-(2,2,1)-2,5-heptadiene is reacted with one mole of cyclopentadiene as more particularly described and claimed in the copending divisional application of Rex E. Lidov, Serial No. 325,881, filed December 13, 1952, or when one mole of hexachlorocyclopentadiene is reacted with one mole of bicyclo-(2.2.1)-2,5-heptadiene as more particularly described and claimed in the copending application of Rex E. Lidov, Serial No. 45,573, filed August 21, 1948, is represented by the planar structural formula which follows immediately hereafter.

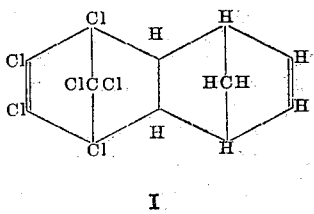

I

Similarly, when the primary products, above represented, are treated with a peracid and thus epoxidized the resulting new derivatives can, in planar structural fashion be denoted as

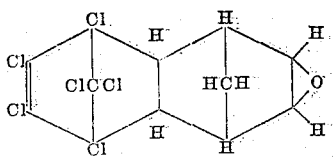

The planar structures hereinbefore set forth are, as stated, representative of the two primary products obtained when one mole of hexachlorocyclopentadiene is caused to react with one mole of bicyclo-(2.2.1)-2,5-heptadiene and when one mole of cyclopentadiene is caused to react with one mole of 1,2,3,4,7,7-hexachlorobicyclo-(2.2.1)-2,5-heptadiene and of the two epoxides obtained when each of those primary products is epoxidized. Yet each of the two compounds represented by a single graphical structure is physically and chemically distinct from the other. Hence, in order to illustrate and explain the differences between the compounds which may properly be represented by the planar structures hereinabove set forth it will be necessary to discuss briefly the stereo chemical configurations of such compounds.

Given a simple bicycloheptene compound such as

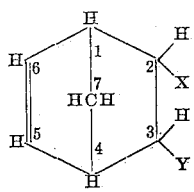

II it is believed that the four carbon atoms 2, 3, 5, and 6 may be considered to lie in the plane of the paper with the carbon atoms 1 and 4 above that plane and with the carbon atom 7 raised above that plane even further than atoms 1 and 4. The bonds joining the atoms H and X and H and Y to carbon atoms 2 and 3 are then thought to be disposed above and below the plane of the paper. The planar structure II consequently (disregarding optical isomerism) corresponds to three stereoisomers: these structures may be represented by three dimensional drawings, thus:

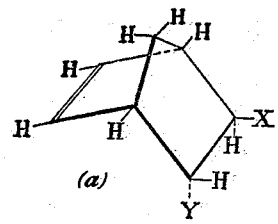

(a)

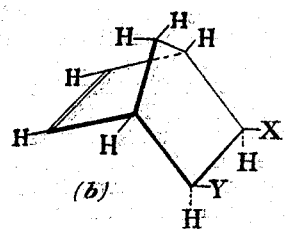

(b)

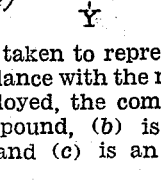

(c)

If both X and Y are taken to represent chlorine atoms, then, in accordance with the nomenclature most commonly employed, the compound (a) is a transdichloro compound, (b) is an exo-cis-dichloro compound and (c) is an endo-cis-dichloro compound.

It is further widely believed that when the attachments X and Y are parts of a ring system containing not more than six atoms the rings thus fused must assume either an exo-cis or an endo-cis configuration; presumably, a trans configuration is necessarily excluded.

If a compound such as I, above, is further examined, it follows that, four theoretically possible stereoisomers are represented:

(1) A compound in which the second 6 membered ring is fused in the exo-cis position and in which the endomethano bridge in the second ring is oriented, in a general sense, in the same direction as the endomethano bridge in the first 6 membered ring.

(2) A compound in which the second 6 membered ring is fused in the exo-cis position but in which the orientation of the second endomethano bridge is directed in the opposite sense from that of the first.

These may be shown three dimensionally as:

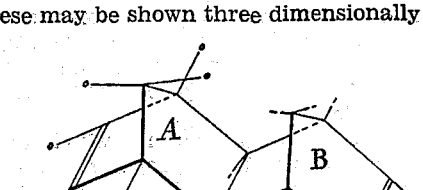

(d)

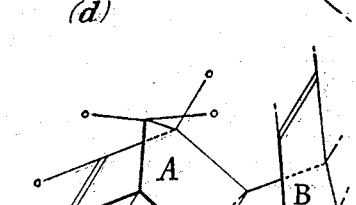

(e)

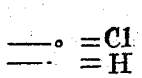

I shall henceforth speak of compound (d) as possessing an exo-exo configuration and further we shall refer to both ring A and ring B in that compound as possessing an exo configuration.

I shall henceforth say that compound (e) possesses an exo-endo configuration and further we shall say that ring A in compound (e) possesses an exo configuration while ring B of compound (e) possesses an endo configuration.

The other two compounds represented by the planar structure I are the corresponding variants in which the second fused ring is in the endo-cis position. These may be shown as:

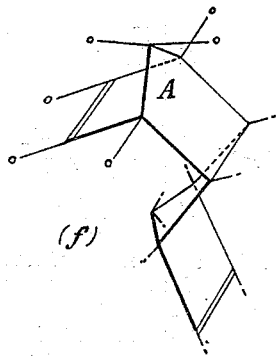

(f)

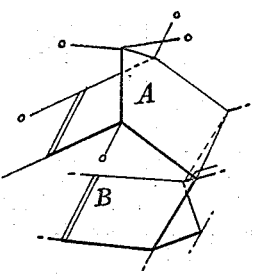

(g)

——○ = Cl
——· = H

Henceforth I shall refer to compound (f) as possessing an endo-exo configuration and I shall further state that ring A in compound (f) possesses an endo configuration and that ring B in compound (f) possesses an exo configuration. Similarly I shall refer to compound (g) as possessing an endo-endo configuration and I shall further say that both rings of compound (g) possess an endo configuration.

I do not know with certainty which of the configurations shown should properly be assigned to my various compounds. It is my present belief that the compound formed when one mole of hexachlorocyclopentadiene reacts with one mole of bicyclo-(2.2.1)-2,5-heptadiene possesses either the exo-exo (d) configuration or the endo-exo (f) configuration: I shall henceforth call the configuration obtained in this fashion the "alpha configuration" and we shall call the series of compounds so obtained the "alpha series." I further believe that the compound formed when cyclopentadiene reacts with 1,2,3,4,7,7-hexychlorobicyclo-(2.2.1)-2,5-heptadiene possesses either the endo-endo (g) configuration or the exo-endo (e) configuration. I shall henceforth call the configuration obtained by this second reaction method the "beta configuration" and we shall call the series of compounds so obtained the "beta series." I believe further that if the first of these compounds (alpha) possesses the exo-exo configuration then the second of these compounds (beta) possesses the endo-endo configuration whereas if the alpha compounds possess the endo-exo configuration then the beta compounds possess the exo-endo configuration.

I believe that it is obvious that the discussion of configuration has not, to this point, considered the spatial relationships existing when the compound under consideration is one possessing more than two fused bicycloheptane rings. It follows, however, from what has already been said that such addition of one mole of a cyclopentadiene to a mole of any given fused polycyclic compound can lead to the formation of four stereoisomers. But since from our present knowledge of reactions of this type it appears that they tend to proceed to give stereo-chemically pure products the nature of which is determined primarily (although not necessarily exclusively) by the reactants, it follows that subsequent addition of cyclopentadienes to the tetracyclic primary products will actually lead to the formation of only one of the four theoretically possible additional configurations. From our present standpoint it is equally important to note that such additional reactions of cyclopentadienes with the four (alpha,beta, etc.) primary stereo-isomers of hexahalotetracyclododecadiene will in each case involve substantially the same reaction, viz., the addition of a cyclopentadiene to the double bond of an unhalogenated bicycloheptene ring system; it therefore appears reasonable to assume that the stereo-chemical configuration around the added fusion points will be the same for each of the primary isomers.

From what has just ben said it follows further that given four hexahalohexycyclododecadienes, formed by the addition of cyclopentadiene to the four hexahalotetracyclododecadienes, the essential configurational differences between them will be those which were originally present in the tetracyclododecadiene generators.

Accordingly, it would appear that in the multiple fused ring compounds which we herein disclose the configurational differences of importance are those which are present around the points of fusion of the hexahalogenated bicycloheptene ring system and the adjacent bicycloheptene ring system. I shall, therefore, henceforth refer to stereochemical configurations around this fusion line as the "basic stereochemical configuration" of my new compounds: it is this configuration with which I shall be primarily concerned and it is this configuration which will determine whether a compound is an alpha series compound, a beta series compound, etc.

It should be further noted that in addition to the various derivatives which can be prepared from my new compounds which have already been hereinabove discussed it is possible to convert our new beta halogenated polycyclic compounds to compositions possessing still another of the four possible configurations. I shall henceforth call this third configuration the "gamma configuration" and I shall call the series of compounds possessing the gamma configuration the "gamma series." This will be more specifically illustrated in the examples which follow.

It should be clearly understood that, as already noted, the new compounds of my present invention include both the beta series of compounds derived as primary products directly from the Diels-Alder reaction of a cyclopentadiene with a hexahalocycloheptadiene and the compounds in the beta and gamma series obtained from the products denoted above as primary be reaction, with and without rearrangement, at the reactive double bond of those primary products. The nature of the rearrangement which may be involved in producing the gamma series will be more fully discussed hereinafter: a somewhat more detailed exposition of the relationship existing between the beta and gamma series will also be presented. However, let it here be noted that the term "allo-configuration" is defined as a generic term to denote the configuration of those compounds having either the beta or the gamma configuration; other configurations are explicitly excluded when the "allo" terminology is employed. As here employed, the prefix "allo," obviously borrowed from the field of steroid chemistry, is to be given only the significance hereinabove attached to it: it is not intended to connote the relationships for which it is used in the steroid field.

The diene syntheses can be accomplished most simply by sealing the generators into a suitable reaction vessel capable of withstanding pressures up to 300 pounds per square inch and heating the vessel and its contents to a temperature not exceeding 225° C. for a period of one to twenty hours.

The statement of reaction conditions hereinabove given is actually a recital of the most vigorous conditions which need be employed for the synthesis of the new compositions of matter which we have discovered. In the majority of cases, the reactions proceed rapidly and well at temperatures between 50°–150° C. and at pressures which are only slightly above atmospheric pressure. Actually, it is the vapor-pressure of the lowest boiling generator which determines the operating pressure, and when the boiling point of this generator lies above 80° C. the synthesis can usually be carried out at atmospheric pressure. Of course, if the polycyclic reactant boils in the temperature range in which the reaction is being conducted provision must be made for its reflux.

These novel halogenated hydrocarbons and hydrocarbon derivatives can also be prepared in the presence of suitable solvents. In general, reactions in solution require a longer period of time than reactions carried out in the absence of solvent. There is some advantage, however, which results from the fact that the reaction and the reaction temperature can be somewhat more easily controlled when a solvent is used.

A wide variety of solvents can be employed in carrying out these preparations. The rate of reaction will be highest if the solvent chosen has a boiling point above 80° C. For this purpose, chlorobenzene, xylene, dibutyl ether, etc., can advantageously be chosen. If desired, however, materials such as benzene, toluene, butyl alcohol, dioxane, etc., can also be used, at the expense, of course, of reaction time.

The examples which follow will serve to illustrate more completely and explicitly the methods and procedures which may be employed to prepare the new compositions of matter which we have invented. It is, of course, to be understood that these examples are illustrative only and that they are not to be taken as limiting the scope of my invention.

Examples I, II and III which follow show how the one to one adduct of cyclopentadiene with 1,2,3,4,7,7-hexachlorobicyclo-(2.2.1)-2,5-heptadiene can be prepared. Examples I and II illustrate the preparation of the necessary polychlorobicyclicdiene as more particularly described and claimed in my copending continuation-in-part application Serial No. 327,458, filed December 22, 1952, and Example III indicates how that diene may be reacted with cyclopentadiene as described and claimed in the indicated copending divisional application of Rex E. Lidov, Serial No. 325,881.

EXAMPLE I

A 3 liter flask equipped with a sparger and a thermometer was charged with 2,550 grams of hexachlorocyclopentadiene having a purity of approximately 90%. Gaseous vinyl chloride in the reaction vessel was maintained at 2 atmospheres (absolute pressure) and the temperature of the reacting liquid was maintained at 120±2° C. The reaction was discontinued after 48 hours, and the reaction solution was fractionated to separate unchanged hexachlorocyclopentadiene and the product. At a distillation pressure of 20 mm. Hg abs. the fraction distilling at 122–130° C. was separated; this material was unchanged hexachlorocyclopentadiene. A second fraction, which solidified in the receiver, boiling between 130–140° C. was also collected. This fraction was melted and transferred to a beaker, cooled and brought on a suction filter in order to separate additional hexachlorocyclopentadiene. The residue on the filter was dissolved in methanol, and treated with decolorizing charcoal at the boiling point of the solution; the methanol was completely evaporated from the solution and the crystals which resulted were air dried. In this way 694.5 grams of a product melting between 125–136° C. was recovered.

*Analysis.*—Calculated for C7H3Cl7: Carbon, 25.07%; hydrogen, .86%; chlorine, 74.1%. Found: Carbon 25.5%; hydrogen, .86%; chlorine, 74.1, 74.4%.

The compound thus obtained is the adduct of hexachlorocyclopentadiene with vinyl chloride, 1,2,3,4,5,7,7-heptachlorobicyclo-(2.2.1)-2-heptene, presumably correctly represented by the planar structural formula:

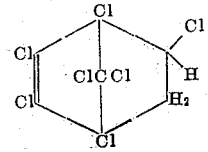

EXAMPLE II

Heptachlorobicycloheptene (product of Example I) was treated with ethanolic potassium hydroxide solution at the reflux temperature of ethanol for approximately 4 hours; the solution contained 3 moles of potassium hydroxide for each mole of the chloro compound present therein and its concentration with respect to potassium hydroxide was approximately 3 molar. The reaction mixture became very dark and inorganic salts were thrown out of solution. These salts were separated on a filter and most of the ethanol was removed, by evaporation, from the remaining solution. The concentrated solution which resulted was stirred into water and the mixture was acidified with hydrochloric acid. Most of the water was decanted from the resulting two phase mixture and the residue was extracted with diethyl ether. This step in the process resulted in the formation of an emulsion which separated only slowly. The separated ether phase was dried over anhydrous sodium sulfate and the ether was evaporated leaving a black oily material. This black oily material was distilled in vacuo and the cut boiling between 128–145° C. at 18 mm. Hg abs. was collected. The material in fraction represented a yield of approximately 78% based on the amount of heptachlorobicycloheptene taken for reaction.

*Analysis.*—Calculated for $C_7H_2Cl_6$: Carbon, 28.1%; hydrogen, 0.67%. Found: Carbon, 28.5%; hydrogen, 0.81%.

The compound thus obtained is 1,2,3,4,7,7-hexachlorobicyclo-(2.2.1) - 2,5 - heptadiene presumably correctly represented by the planar structural formula:

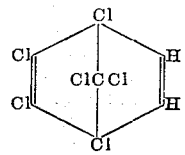

EXAMPLE III

Into a 500 ml. 3-neck round bottom flask equipped with a stirrer, thermometer and reflux condenser was placed 299 grams (1 mole) of the hexachlorobicycloheptadiene of Example II. While stirring very slowly 46 grams (0.7 mole) of freshly distilled cyclopentadiene was added to the chloro compound. The reaction mixture was warmed to 65° C. and the lower half of the flask was insulated to retard heat loss. The temperature rose slowly to 98° C.; the temperature was then maintained in the vicinity of 100° C. by regulation of the stirring rate. When the reaction ceased to liberate heat and the temperature dropped to 50° C. another 33 grams (0.5 mole) of cyclopentadiene was added to the reaction mixture and the solution was then heated and maintained between 75–90° C. for 2 hours. At the end of that time the mixture was cooled and when the temperature reached 60° C. solid material began to separate. The mixture was rewarmed to 70° C. and poured into a boiling acetone-methanol mixture. When the solution thus obtained cooled a white crystalline solid separated. This was separated on a filter and dried; it weighed 210 grams and melted between 240–242° C. Additional crystalline material substantially identical with that first obtained was recovered by concentration of the mother liquor.

*Analysis.*—Calculated for $C_{12}H_8Cl_6$: Carbon, 39.49%; hydrogen, 2.21%; chlorine, 58.30%. Found: Carbon, 39.6%; hydrogen, 2.16%; chlorine, 58.1%.

The compound thus obtained is beta-hexachlorotetracyclododecadiene (beta-1,2,3,4,10,10-hexachloro - 1,4,4a,5,8,8a - hexahydro - 1,4,5,8-dimethanonaphthalene), presumably correctly represented by the planar structural formula:

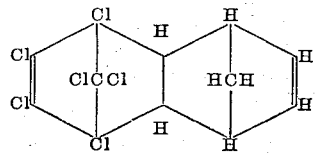

Example IV illustrates the preparation of an epoxy derivative of the beta-hexachlorotetracyclododecadiene.

EXAMPLE IV

Beta - hexachlorotetracyclododecadiene (12 grams; 0.033 mole) was dissolved in 50 ml. of benzene and 15 grams of 35% peracetic acid was added to the mixture. The addition was made dropwise while stirring the solution; the reactants were initially at room temperature. The reaction was mildly exothermic. The reaction mixture was stirred overnight and then warmed to 45° C. for approximately 1 hour. The reaction mixture was then steam distilled to remove the excess peracetic acid, the acetic acid and the benzene. The solid residue obtained was extracted with diethyl ether and the ether solution was washed with water and then dried over anhydrous sodium sulfate. The resulting substantially anhydrous solution was placed on the steam bath and the residue left after the ether had evaporated was recrystallized from methanol. In this manner there was obtained 11.5 grams of a white crystalline material which melted with decomposition at 245° C.

*Analysis.*—Calculated for $C_{12}H_8Cl_6O$: Carbon, 37.86%; hydrogen, 2.11%; chlorine, 55.95%. Found: Carbon, 38.0%; hydrogen, 2.19%; chlorine, 55.8%.

This compound thus obtained is beta-epoxy-hexachlorotetracyclododecene (beta-1,2,3,4,10,10-hexachloro - 6,7 - epoxy - 1,4,4a,5,6,7,8,8a - octahydro - 1,4,5,8 - dimethanonaphthalene) presumably possessing the structure

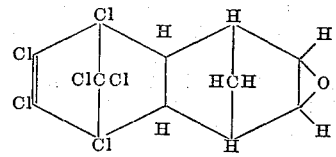

The fact that reactions occurring at the double bond in the unhalogenated ring of hexachlorotetracyclododecadiene can give rise to derivatives of the gamma series of stereo-isomers is particularly noteworthy. It is generally believed that when a reaction occurs at the double bond of a bicycloheptene compound which results in the formation of a "carbonium ion" as an intermediate, the ring system will rearrange: as a result, groups attached to the ethano bridge in the endo position will be found in an exo position in the new compound formed in the reaction. This statement presupposes that if each of the carbon atoms of the ethano bridge bears a substituent, both of the substituents involved were originally in an endo position. Reasoning from this general assumption and the fact that a rearrangement occurs it may be inferred that the unhalogenated bicycloheptene ring in beta-hexachlorotetracyclododecadiene posses an endo configuration and that the corresponding ring in the gamma compound possesses an exo configuration. It is the present belief that the halogenated ring in the beta comopund possesses the same configuration as the halogenated ring in the gamma compound and further that the halogenated ring of the alpha series of compounds is different in its configuration from that of the corresponding rings in the beta and gamma series of compounds.

The specific illustrative examples hereinbefore given do not, of course, include all of the new compounds in the beta and gamma series which can be obtained by procedures already known to the art or herein disclosed. Thus, to indicate briefly other reactions which can be utilized for this purpose the following reaction paths can be cited. Obviously, such a recitation is again only intended to serve as a general guide and is not intended to be complete.

*a.* Hexabromocyclopentadiene may be caused to react by means of the diene synthesis reaction with vinyl chloride and the product thus obtained may be dehydrochlorinated to 1,2,3,4,7,7-hexabromobicyclo-(2.2.1)-heptadiene. This diene may be reacted with cyclopentadiene to give beta-hexabromotetracyclododecadiene.

b. Beta-hexabromotetracyclododecadiene may be caused to undergo the reactions hereinbefore illustrated.

c. Beta-hexachlorotetracyclododecadiene can be brominated to form a dibromohexachlorotetracyclododecene (beta or gamma).

d. Beta or gamma-dibromohexachlorotetracyclododecene may be reacted with sodium sulfide to form an episulfido derivative.

e. The beta- or gamma-6,7-episulfidohexachlorotetracyclododecene may be oxidized with peracetic acid to form a beta or gamma-6,7-episulfoxyhexachlorotetracyclododecene.

Many similar reactions useful for preparing the new compositions of my invention might be listed. Since, however, such a listing is intended only as an aid for the skilled chemist desiring to utilize my invention it is believed that no useful purpose can be gained by further extending the list of reactions already set forth.

While, for the sake of clarity, I have discussed the stereochemistry of my new compounds in some detail in an effort to elucidate the structures of these materials, it should, of course, be understood that my invention is not to be limited by the correctness of the views herein set forth with respect to reaction mechanisms, stereochemical configurations or structural theory.

These new products of my invention possess, as has already been noted, great practical usefulness as insect toxicants. As has already been noted, they are completely stable to alkali both in aqueous and non-aqueous solutions. Moreover, my new compounds exhibit a high degree of toxicity to a wide variety of insects. This is more specifically illustrated hereinafter.

Table II shows the toxicity of my new compounds to the common housefly (*Musca domestica*) in terms of the new halogenated insecticide chlordane, which for this purpose, is rated at 100%. The figures which are shown were obtained using the Kearns' modified small chamber method of test (Soap and Sanitary Chemicals, May 1948, page 133) and the figures in Table II represent the relationship between the weight of chlordane required to produce an $LD_{50}$ and the weight of compound under test required to produce this same mortality.

The significance of these tests may be more readily appreciated after reference to Table I which shows the ratings of the commonly used organic halogenated insecticides when compared, in tests similar to those described above, with heptachlor.

*Table I*

| Compound | Relative Toxicity, Percent |
|---|---|
| Heptachlor | 100 |
| gamma isomer, Hexachlorocyclohexane | 100 |
| chlordane | 40 |
| DDT | 10 |

*Table II*

| Compound | Relative Toxicity, Percent |
|---|---|
| chlordane (standard) | 100 |
| beta-6,7-epoxyhexachlorotetracyclododecene (Ex. IV) | 312 |

Tests of the insecticidal potency of my new compounds using insects other than flies attest the generality of their high insect toxicity.

However, the greatest utility of my new compounds lies in fields unexpectedly different from those in which the earlier known members of the group are most effective. Thus, while certain of the earlier known members of the group such, for example, as alpha-5,6-epoxyhexachlorotetracyclododecene possesses activity against the Mexican bean beetle this activity as much lower than the activity of the corresponding members of the beta series. I have now found that the corresponding beta compounds are extremely active against this common insect pest and that the beta-6,7-epoxy-hexachlorotetracyclododecene is ten to twenty times as toxic to the Mexican bean beetle and to its larvae as is rotenone, the material which at the present time is generally recognized as the standard for control for this insect. The data indicate that, in general, the beta series of compounds shows higher toxicity to this insect than do the corresponding compounds of the alpha series. Since this particular insect tends to exhibit resistance to the halogenated hydrocarbon toxicants normally used to control many other undesirable species such activity on the part of my new compounds is particularly surprising.

The resistance of the various aphis species to the action of the halogenated insect toxicants is many times more marked than that of the Mexican bean beetle. In fact, at the present time, only three substances are effective against the many varieties of this pest, namely, tetraethylpyrophosphate or hexaethyltetraphosphate, parathion and nicotine.

These compounds, because of their high toxicity to mammals, the ease with which they can be absorbed into the body, and the great speed with which they act, are dangerous and must be handled with much caution. Moreover, as aphicides, none of them exerts a significant degree of residual activity.

I have now discovered that my new compound beta-6,7-epoxy-hexachlorotetracyclododecene is extremely effective against the aphis species.

Similar tests also show that beta-6,7-epoxy-hexachlorotetracyclododecene is more than thirteen times as toxic to aphids as is nicotine sulfate. Equally significant is the fact that this new compound exhibits a very high degree of residual activity.

Because of their physical form, their much lower degree of absorbability after external application to the mammalian body, and their much slower rate of toxic action toward mammals, my new compounds are far safer to employ than either parathion or the nicotine salts.

My new compositions of matter are soluble in all of the common organic solvents and they can be utilized as insect toxicants in all the ways customary in the art. Thus they can be dissolved in the insecticide base oils normally employed (as was done to obtain the data of Table II) and the resulting solutions sprayed or otherwise employed in the usual fashion. They can also be combined with finely divided carriers to produce wettable and non-wettable insecticidal dusts, they can be used in the presence of emulsifying agents, with water, and with water and oils to form insecticidal emulsions. They can also be incorporated in aerosol compositions, and, in general, they can be used either as the sole insect toxicant in an insecticidal composition or in combination with other insecticides in order to obtain combination properties and other desirable characteristics.

The unusual properties and great stability of my new compounds make them particularly suitable in a number of less common but highly desirable applications for insecticidal materials. Thus, they can be added to paints, lacquers, varnishes, and polishing waxes which, after application, will give surfaces possessing a high order of insect toxicity. They can be added to paper products of all types either by suitable impregnation of the finished paper materials, or incorporation during the manufacturing process. Similarly they can be added to tackifiers, plasticizers, printing inks, rubber products, etc., in order to provide finished objects possessing inherent toxicity to insect life and resistance to insect attack. They can also be added to various types of plastics and plastic sheetings in order to obtain packaging and wrapping materials themselves resistant to insect attack and able to protect objects packed in them from such attack. Because of their high resistance to the action of alkali, my new compositions can be incorporated into white-washes and other similar surface coatings. Those skilled in the art will, of course, recognize that many other similar uses for these unique compounds are possible, all of which follow from the special combination of valuable properties possessed by them.

It should be noted that my new composition 6,7-epoxy-hexachlorotetracyclododecene appears to possess toxicity to the rat to an unusual degree. As a consequence of this fact it can be used to control this pest; when long period residual activity is needed. These materials will be particularly valuable for rodent control in orchards where the field mouse and similar rodents present a serious problem; applied to the orchard floor or worked lightly into the topsoil they will serve not only to destroy the rodent pest but also to eliminate undesirable insect infestation found in and under the ground.

It will be apparent to those skilled in the art that these new compositions of matter which I have invented will have many uses other than those already enumerated. Thus, some of these materials will have value as plasticizers and as tackifiers in many types of resinous and polymer compositions. These compositions are also valuable as starting compounds and intermediates for perfumes, medicinals, fungicides and other organic compounds useful in the arts and sciences.

Moreover, many modifications of the basic concepts of my invention here presented will be evident to those skilled in the arts. Such modifications are properly to be included within the scope of my disclosed invention which is, in no way, to be restricted by the various illustrative data hereinbefore contained but only by the claims appended hereto.

I claim:

1. The compound 1,2,3,4,10,10 - hexachloro - 6,7 - epoxy - 1,4,4a,5,6,7,8,8a - octahydro - 1,4,5,8 - dimethanonaphthalene having the structural formula:

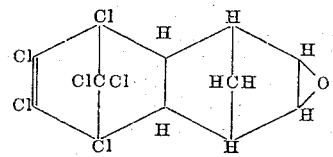

said compound melting with decomposition at approximately 245° C. and being the epoxide of the Diels-Alder adduct obtained by heating cyclopentadiene and 1,2,3,4,7,7 - hexachloro - bicyclo-(2.2.1)-2,5-heptadiene.

2. The method of forming the compound of claim 1, which comprises reacting 1,2,3,4,10,10 - hexachloro - 1,4,4a,5,8,8a - hexahydro - 1,4,5,8 - dimethanonaphthalene having a melting point when pure of approximately 240° C. with peracetic acid.

3. As an insecticidal composition of matter the compound of claim 1 disseminated in an insecticidal adjuvant as a carrier therefor.

4. The method which comprises applying to insects and their habitats the compound of claim 1.

References Cited in the file of this patent

UNITED STATES PATENTS

| Number | Name | Date |
|---|---|---|
| 2,336,208 | Alder | Dec. 7, 1943 |
| 2,382,038 | Bruson | Aug. 14, 1945 |
| 2,507,207 | Hyman | May 9, 1950 |
| 2,509,160 | McBee | May 23, 1950 |
| 2,519,190 | Hyman | Aug. 15, 1950 |

FOREIGN PATENTS

| Number | Country | Date |
|---|---|---|
| 614,931 | Great Britain | Dec. 30, 1948 |
| 618,432 | Great Britain | Feb. 22, 1949 |

OTHER REFERENCES

Pest Control, January 1950, page 30.
Pest Control, January 1949, page 17.
Prill: Journal American Chemical Society, January 1947, pages 62 and 63.
Kearns: Journal of Economic Entomology, February 1949, pages 127 to 134.